United States Patent Office 2,723,183
Patented Nov. 8, 1955

2,723,183

PROCESS FOR PRODUCTION OF AMMONIUM NITRATE

John J. Dorsey, Jr., Monroe, La., assignor to Commercial Solvents Corporation, Terre Haute, Ind., a corporation of Maryland No Drawing. Application March 3, 1953,
Serial No. 340,150

2 Claims. (Cl. 23—103)

My invention relates to a process for the production of ammonium nitrate and more particularly, it relates to an improved single-step process for the preparation of ammonium nitrate from ammonia and nitric acid.

In U. S. Patent 2,568,901 there is described a single-step process for the preparation of ammonium nitrate wherein ammonia and nitric acid are introduced into a packed reactor maintained at an elevated temperature, the reactor being free to drain at its lower end so that the reaction zone is maintained substantially free from reaction products which are removed from the reaction zone as rapidly as possible in two phases, one of which is substantially steam and the other of which is molten ammonium nitrate. The resquired temperature of reaction is attained through the exothermic heat of reaction and external heat which may be supplied in a number of ways including preheating the reactants, externally heating the reactor, etc.

In commercial production of ammonium nitrate utilizing the process of U. S. Patent 2,568,901 the heat in addition to the exothermic heat of reaction is economically and conveniently supplied by preheating the reactants. In the operation of the process, it has been found that there is a maximum allowable nitric acid preheat temperature and when the temperature of the nitric acid feed is allowed to increase above the maximum allowable nitric acid preheat temperature a very unsteady reaction state develops which is characterized by pressure and temperature variations within the reactor. Several reasons have been advanced for the unsteady reaction state which develops when the temperature of the nitric acid reactant is allowed to increase above the maximum allowable acid preheat temperature, among which are, for example, excessive decomposition of nitric acid, excessive pressure in the reactor caused by the large amount of heat resulting from the high nitric acid preheat and the exothermic heat of reaction, etc. I do not, however, intend to be limited by any theory which might explain the unsteady reaction state resulting from an increase in nitric acid preheat temperature above the maximum allowable nitric acid preheat temperature. I have defined the maximum allowable nitric acid preheat temperature as the highest possible nitric acid preheat temperature which does not cause an unsteady reaction state. As pointed out in U. S. Patent 2,568,901, it is desirable to have a high maximum allowable nitric acid preheat temperature since the amount of moisture in the ammonium nitrate product depends largely upon the temperature of the reaction and if the maximum allowable nitric acid preheat temperature can be increased, the additional heat results in an ammonium nitrate product of a relatively decreased moisture content.

In any ammonium nitrate process, the product must be converted to the desired form such as for example, flakes, pellets, prills, etc. It is obvious that the flaking, prilling, crushing, milling, etc. processes for converting the ammonium nitrate to the desired form result in the formation of ammonium nitrate fines, i. e. small particles of a powdery nature. Ordinarily ammonium nitrate fines are recovered by dissolving them as a 25 to 40% solution in water and subsequently concentrating the aqueous solution to drive off essentially all of the water in order to produce solid ammonium nitrate with as low a moisture content as possible. The necessity of carrying out such an operation for the recovery of ammonium nitrate fines not only involves the evaporation of appreciable quantities of water but also a complex system of stainless steel piping and concentration equipment in which to carry out the fines recovery process.

I have now discovered an improved one-step process for the production of ammonium nitrate involving the direct interaction of amonia and nitric acid at elevated temperatures, the process consisting essentially of continuously passing a mixture of nitric acid and ammonia under intimate contact conditions through a reactor tube which is free to drain at its lower end so that it is maintained substantially free from liquid reaction products which are removed from the reactor tube in two phases, one of which is solid ammonium nitrate. My improved process makes possible a higher maximum allowable nitric acid preheat temperature as well as a convenient and economical method for the recovery and utilization of ammonium nitrate fines whereby the solution of and concentration of aqueous solutions of ammonium nitrate is avoided.

My invention consists essentially of dissolving ammonium nitrate, which can be ammonium nitrate fines, in the nitric acid which is introduced into the reactor for combination with ammonia to produce ammonium nitrate, the dissolved ammonium nitrate passing through the reactor along with the newly-produced ammonium nitrate to exit from the reactor as molten ammonium nitrate along with the steam also produced. As a result of thus employing the ammonium nitrate fines, I am not only able to recover efficiently and economically the ammonium nitrate in that form, but also the solution of ammonium nitrate in the nitric acid feed enables me to preheat the nitric acid to a higher temperature, since the maximum allowable nitric acid preheat temperature is raised, and consequently to obtain an ammonium nitrate product of lower moisture content than could otherwise be produced.

In carrying out my invention, I dissolve ammonium nitrate in the nitric acid feed in an amount ranging from about 5% to about 30% by weight. Generally I prefer to employ ammonium nitrate in an amount ranging from about 15 to about 20% by weight in the nitric acid. It is understood, of course, that I may satisfactorily use nitric acid ranging in strength from 20% to 100% nitric acid content. Amounts near the lower limit of the range of ammonium nitrate content in the nitric acid feed provide only slight increase in the maximum allowable nitric acid feed temperature while amounts above the upper limit of the range of amounts of ammonium nitrate which can be used do not provide for any substantial additional increase in the maximum allowable nitric acid preheat temperature. Ordinarily without the addition of ammonium nitrate to the nitric acid feed, the maximum allowable nitric acid preheat temperature is below about 250° F. in the range of about 200° to about 250° F. When ammonium nitrate is employed in the nitric acid feed in amounts within the range set out above, the maximum allowable nitric acid preheat temperature is raised, depending upon the amount of ammonium nitrate used, to within the range from about 250 to about 330° F.

It is of course obvious from the above description of my improved process for producing nitric acid that an economical and convenient means for recovering ammonium nitrate fines is provided. The convenience of merely recycling the fines in a continuous process to the nitric acid feed and dissolving the fines in the nitric acid is a considerable factor in the economy of the process. The ammonium nitrate fines are reprocessed to obtain a suitable size material for general utility while at the same time acting to increase the maximum allowable nitric acid preheat temperature resulting in a product of a decreased moisture content.

The following examples are offered to illustrate my invention but I do not intend to be limited to the particular procedures, materials, and proportions set forth but rather I intend for all the equivalents and variations obvious to those skilled in the art to be included within the scope of this specification and the attached claims.

Example I

Nitric acid of 63% concentration in which was dissolved ammonium nitrate fines in an amount equal to 15.7% by weight of the aqueous nitric acid was preheated to 270° F. and mixed at the rate of 418 pounds per hour with ammonia amounting to 66.7 pounds per hour. The mixture was passed downwardly through a vertical stainless steel tube 7 feet long with an inside diameter of 1.85 inches, the reactor being packed with ¼ in. Berl saddles. Molten ammonium nitrate was collected as it flowed from the reactor tube at the rate of 346.9 pounds per hour. The ammonium nitrate product was found to have a moisture content of 0.935%.

Example II

Nitric acid at a concentration of 63% in which was dissolved ammonium nitrate amounting to 15.5% by weight of the aqueous nitric acid was mixed at the rate of 324 pounds per hour with ammonia in an amount equal to 47.5 pounds per hour and the mixture flowed into a reactor such as that described in Example 1. The nitric acid was preheated to 300° F. Molten ammonium nitrate was collected as it flowed from the reactor tube at the rate of 256 pounds per hour, the ammonium nitrate product having a moisture content of 0.732%.

Example III

Nitric acid having a concentration of 58% was mixed at the rate of 425 pounds per hour with ammonia at the rate of 66 pounds per hour and the mixture passed into a reactor of the type described in Example 1. The nitric acid was preheated to a temperature of 235° F. which was the maximum allowable nitric acid preheat temperature. Molten ammonium nitrate was collected as it flowed from the reactor tube at the rate of 322 pounds per hour. The ammonium nitrate product had a moisture content of 3.1%. The moisture content of the product of this experiment is to be compared with the moisture content of the products obtained in Example I and II where ammonium nitrate fines were dissolved in the nitric acid feed.

Now having described my invention, what I claim is:

1. In a process for producing ammonium nitrate by reacting nitric acid and ammonia at elevated temperature and continuously removing steam and molten ammonium nitrate as reaction products, the improvement which comprises dissolving from about 5% to about 30% solid ammonium nitrate by weight in the nitric acid feed.

2. In a process for producing ammonium nitrate by reacting nitric acid and ammonia and continuously removing steam and molten ammonium nitrate as reaction products, the improvement which comprises dissolving from about 5% to about 30% solid ammonium nitrate by weight in the nitric acid feed and preheating the nitric acid solution of ammonium nitrate to a temperature ranging from about 250° to about 330° F.

References Cited in the file of this patent

UNITED STATES PATENTS

| | | |
|---|---|---|
| 1,661,203 | Toniolo | Mar. 6, 1928 |
| 2,568,901 | Stengel | Sept. 25, 1951 |

FOREIGN PATENTS

| | | |
|---|---|---|
| 370,278 | Great Britain | Apr. 17, 1932 |